(12) United States Patent
Fukuda

(10) Patent No.: US 8,333,314 B2
(45) Date of Patent: Dec. 18, 2012

(54) STRUCTURE FOR JOINING MEMBERS

(75) Inventor: Hiroshi Fukuda, Hino (JP)

(73) Assignee: Hino Motors, Ltd., Hino-shi (JP)

( * ) Notice: Subject to any disclaimer, the term of this patent is extended or adjusted under 35 U.S.C. 154(b) by 121 days.

(21) Appl. No.: 12/513,026

(22) PCT Filed: Nov. 9, 2007

(86) PCT No.: PCT/JP2007/001228
§ 371 (c)(1),
(2), (4) Date: Apr. 30, 2009

(87) PCT Pub. No.: WO2008/056449
PCT Pub. Date: May 15, 2008

(65) Prior Publication Data
US 2010/0065611 A1    Mar. 18, 2010

(30) Foreign Application Priority Data

Nov. 10, 2006  (JP) .................................. 2006-305568
Jan. 26, 2007  (JP) .................................. 2007-016942

(51) Int. Cl.
*B23K 20/12*   (2006.01)
*B32B 15/01*   (2006.01)
(52) U.S. Cl. ..................... 228/112.1; 228/2.1; 428/594
(58) Field of Classification Search ............... 228/112.1, 228/2.1
See application file for complete search history.

(56) References Cited

U.S. PATENT DOCUMENTS

| 6,454,156 B1 * | 9/2002 | Taras et al. ..................... 228/165 |
| 6,843,405 B2 * | 1/2005 | Okamoto et al. ............ 228/112.1 |
| 2004/0144830 A1 * | 7/2004 | Murakami ................. 228/112.1 |

FOREIGN PATENT DOCUMENTS

| JP | 2004 136365 | 5/2004 |
| JP | 2004 148320 | 5/2004 |
| JP | 2005 288499 | 10/2005 |
| JP | 2006 136906 | 6/2006 |
| JP | 2006 150389 | 6/2006 |
| JP | 2006 289409 | 10/2006 |

OTHER PUBLICATIONS

U.S. Appl. No. 12/447,919, filed Apr. 30, 2009, Fukuda.
U.S. Appl. No. 12/447,495, filed Apr. 28, 2009, Tanaka, et al.
U.S. Appl. No. 12/518,142, filed Jun. 8, 2009, Fukuda.

* cited by examiner

*Primary Examiner* — Maria Veronica Ewald
*Assistant Examiner* — Megha Mehta
(74) *Attorney, Agent, or Firm* — Oblon, Spivak, McClelland, Maier & Neustadt, L.L.P.

(57) ABSTRACT

A structure for joining members which is suited for joining of thin members together and suited for joining of members made of different materials. The structure includes a nut, a first member superposed on the nut such that a preliminarily formed hole on the first member is contiguous with the threaded hole of the nut, and a second member superposed on the first member so as to cover the hole.

3 Claims, 8 Drawing Sheets

STRUCTURE FOR JOINING MEMBERS

TECHNICAL FIELD

The present invention relates to a structure for joining members.

BACKGROUND ART

Friction stir welding or joining is a method for interconnecting members to be joined without fusion (see, for example, Patent Literature 1).

In the method, a workpiece comprising stacked members to be joined together is rested on a support tool or backing member. While rotated, a joining tool is pushed against the workpiece so that the materials softened due to frictional heat and plastic flow are assimilated together through stirring.

Then, the joining tool is released from the workpiece to allow the assimilated materials to solidify, thereby joining the members together.

The joining tool comprises a cylindrical shoulder and a short cylindrical pin which is coaxially contiguous with the shoulder, is protruded as a tip of the tool and is smaller in outer diameter than the shoulder.

[Patent Literature 1] JP 2004-136365A

SUMMARY OF INVENTION

Technical Problems

However, technique disclosed in Patent Literature 1 has no consideration on joining of thin members together at all and fails in joining of members made of different materials.

The invention was made in view of the above and has its object to provide a structure for joining members which is suited for joining of the thin members together and suited for joining of the members made of different materials.

Solution to Problems

In order to attain the above object, the invention comprises a member to be fitted having an opening at one end thereof and a circumferentially extending groove on a wall defining said opening, a first member superposed on the member to be fitted such that a preliminarily formed hole in the first member is contiguous with said opening, and a second member superposed on the first member so as to cover said hole, material derived from the second member being adapted to enter into the hole of the first member and opening of the member to be fitted due to frictional heat and plastic flow.

The invention comprises a member to be fitted having an opening at one end thereof and a circumferentially extending groove on a wall defining said opening, a first member supposed on the member to be fitted so as to cover said opening, and a second member superposed on said first member, material derived from the first and second members being adapted to enter into the opening of the member to be fitted due to frictional heat and plastic flow.

The invention comprises a member to be assimilated having an opening at one end thereof, a first member superposed on the member to be assimilated so as to cover said opening and a second member superposed on the first member, material derived from said first and second members being assimilated with a periphery of the opening of the member to be assimilated due to frictional heat and plastic flow.

The invention comprises a first member with an opening, a member to be fitted having a hole defined by a wall surface having a circumferentially extending groove and superposed on said first member such that said hole is contiguous with said opening, and a second member superposed on the member to be fitted so as to cover said hole, said member to be fitted being preliminarily fixed to the first member, the second member being adapted to enter into the opening of the member to be fitted due to frictional heat and plastic flow.

The invention comprises a first member, a member to be assimilated having a hole and superposed on said first member, and a second member superposed on the member to be assimilated so as to cover said hole, the second member being assimilated with a periphery of the opening of the member to be assimilated and the first member due to frictional heat and plastic flow.

The invention comprises a first member, a member to be fitted having a hole defined by a wall surface having a circumferentially extending groove and superposed on said first member, and a second member superposed on said member to be fitted so as to cover said hole, the second and first members being adapted to enter into the opening of said member to be fitted due to frictional heat and plastic flow.

In the invention, a nut may be used as the member to be fitted or as the member to be assimilated.

Advantageous Effects of Invention

A structure for joining members according to the invention can obtain the following meritorious effects and advantages.

(1) In the invention where a first member is clamped by a second member and a member to be fitted, member derived from the second member being adapted to engage into the groove of the member to be fitted due to frictional heat and plastic flow, the first and second members can be joined together efficiently and reliably even if they are thin in thickness or they are made of different materials.

(2) In the invention where a first member is clamped by a second member and a member to be fitted, material derived from the first and second members being adapted to engage into the groove of the member to be fitted due to frictional heat and plastic flow, the first and second members can be joined together efficiently and reliably even if they are thin in thickness.

(3) In the invention where a first member is clamped by a second member and a member to be fitted, material derived from the first and second members being assimilated with the member to be fitted due to frictional heat and plastic flow, the first and second members can be joined together efficiently and reliably even if they are thin in thickness.

(4) In the invention where a second member is superposed on a member to be fitted preliminarily fixed to a first member, material derived from the second member being adapted to engage into a groove of the member to be fitted due to frictional heat and plastic flow, the first and second members can be joined together efficiently and reliably even if they are thin in thickness or they are made of different materials.

(5) In the invention where a member to be assimilated is clamped by first and second members, material derived from the second member being assimilated with the member to be assimilated and the first member due to frictional heat and plastic flow, the first and second members can be joined together efficiently and reliably even if they are thin in thickness.

(6) In the invention where a member to be fitted is clamped by first and second members, material derived from the first and second members being adapted to engage into a groove of the member to be fitted due to frictional heat and plastic flow, the first and second members can be joined together efficiently and reliably even if they are thin in thickness or they are made of different materials.

(7) In the invention, a nut as standardized component may be used as member to be fitted or as member to be assimilated, which contributes to reduction in cost.

Figure 1A:
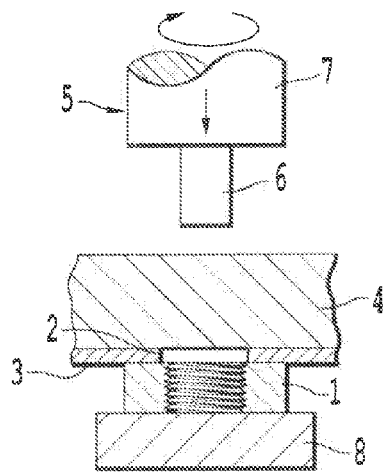
FIG. 1 is a schematic view showing workflow in a first embodiment of a structure for joining members according to the invention.

REFERENCE SIGNS LIST 1 nut (member to be fitted/member to be assimilated)
2 hole
3 first member
4 second member
10 hole
11 first member
12 second member
17 first member
18 second member
19 assimilation layer
21 assimilation layer
24 assimilation layer
27 assimilation layer

DESCRIPTION OF EMBODIMENTS

Embodiments of the invention will be described in conjunction with the drawings.

Figure 1B:
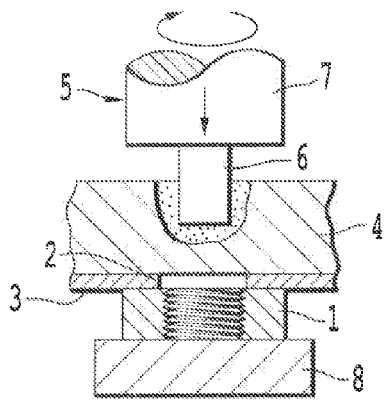
Figure 1C:
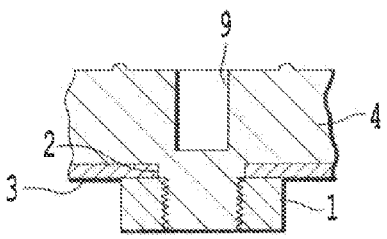

FIG. 1 is directed to a first embodiment of a structure for joining members according to the invention.

The structure for joining members comprises a nut 1, a first member 3 superposed on the nut 1 such that a hole 2 preliminarily formed in the first member is contiguous with the threaded hole of the nut 1, and a second member 4 superposed on the first member 3 so as to cover the hole 2, the first member 3 being thinner than the second member 4.

The second member 4 is made of aluminum alloy. The nut 1 and the first member 3 may be made of any material such as aluminum alloy or steel.

As shown in (c) of FIG. 1, material derived from the second member 4 is adapted to enter into the hole 2 of the first member 3 and threaded hole of the nut 1 due to frictional heat and plastic flow, the first member 3 being clamped by the second member 4 and nut 1.

The above-mentioned shaping of the second member 4 is conducted, using, e.g., a joining tool 5 as shown in (a) and (b) of FIG. 1.

The joining tool 5 comprises a cylindrical pin 6 smaller in outer diameter than the threaded hole of the nut 1 and hole 2 of the first member 3 and coaxially contiguous with a tip surface of a cylindrical shoulder 7 which in turn is larger in outer diameter than the pin 6, an entire length of the pin 6 being slightly shorter than a sum of thicknesses of the first and second members 3 and 4.

The joining tool 5 is made of steel harder and higher in softening temperature than aluminum alloy.

First, the nut 1 is rested on the backing member 8 and the second and first members 4 and 3 are superposed on the nut.

If the nut 1 and the first member 3 are made of the same material, they may be preliminarily fixed together by welding.

Then, while the joining tool 5 is rotated, the pin 6 of the tool 5 is pushed against the second member 4 so that the pin 6 gradually goes in the member softened due to frictional heat and plastic flow.

Soon, material derived from the second member 4 softened due to frictional heat and plastic flow is pushed via the hole 2 of the first member 3 into the threaded hole of the nut 1 and onto an inner periphery constituting the threaded hole. Eventually, the end surface of the shoulder 7 of the joining tool 5 is pushed against the second member 4.

Further, the joining tool 5 is released from the second member 4 so that the plastic flow portion of the second member 4 and the material derived from the second member 4 pushed under plastic flow into the threaded hole of the nut 1 are allowed to solidify. Thus, the material is fitted into the threaded groove; the backing member 8 is released from the nut 1, thus completing the joining of the first and second members 3 and 4.

A hole 9 of the second member 4 formed by removal of the pin 6 of the joining tool 5 may be machined to be threaded for possible bolting of a further member.

The nut 1 may be replaced by a member to be fitted having parallel grooves on a wall surface defining an opening or by a cap nut.

Figure 2A:
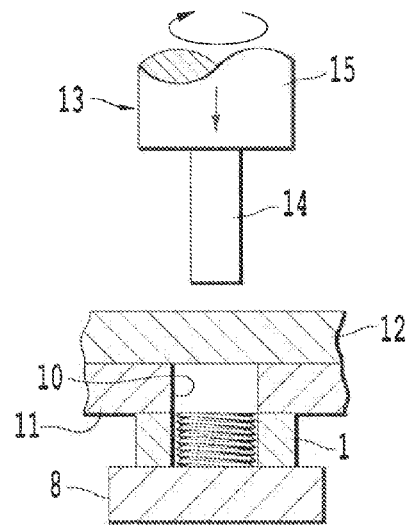
FIG. 2 is a schematic view showing workflow in a second embodiment of a structure for joining members according to the invention.
Figure 2B:
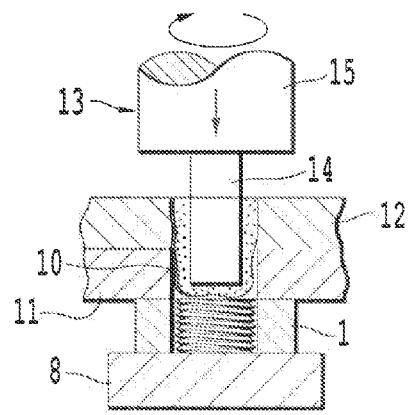
Figure 2C:
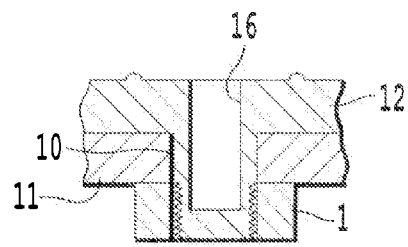

FIG. 2 is directed to a second embodiment of a structure for joining members according to the invention.

The structure for joining members comprises a nut 1, a first member 11 superposed on the nut 1 such that a hole 10 preliminarily formed in the first member is contiguous with the threaded hole of the nut, and a second member 12 superposed on the first member 11 so as to cover the hole 10, the first and second members 11 and 12 being of the same thickness.

The second member 12 is made of aluminum alloy. The nut 1 and the first member 11 may be made of any material such as aluminum alloy or steel.

As shown in (c) of FIG. 2, material derived from the second member 12 is adapted to enter into the hole 10 of the first member 11 and threaded hole of the nut 1 due to frictional heat and plastic flow, the first member 11 being clamped by the second member 12 and nut 1.

The above-mentioned shaping of the second member 12 is conducted, using, e.g., a joining tool 13 as shown in (a) and (b) of FIG. 2.

The joining tool 13 comprises a cylindrical pin 14 smaller in outer diameter than the threaded hole of the nut 1 and hole 10 of the first member 11 and coaxially contiguous with a tip surface of a cylindrical shoulder 15 which in turn is larger in outer diameter than the pin 14, an entire length of the pin 14 being slightly shorter than a sum of thicknesses of the nut 1 and first and second members 11 and 12.

The joining tool 13 is made of steel harder and higher in softening temperature than aluminum alloy.

First, the nut 1 is rested on the backing member 8 and the second and first members 12 and 11 are superposed on the nut.

If the nut 1 and the first member 11 are made of the same material, they may be preliminarily fixed together by welding.

Then, while the joining tool 13 is rotated, the pin 14 of the tool 13 is pushed against the second member 12 so that the pin 14 gradually goes in the member softened due to frictional heat and plastic flow.

Soon, material derived from the second member 12 softened due to frictional heat and plastic flow is pushed via the hole 10 of the first member 11 into the threaded hole of the nut 1 and onto an inner periphery constituting the threaded hole. Eventually, the end surface of the shoulder 15 of the joining tool 13 is pushed against the second member 12.

Further, the joining tool 13 is released from the second member 12 so that the plastic flow portion of the second member 12 and the material derived from the second member 12 pushed under plastic flow into the threaded hole of the nut 1 are allowed to solidify. Thus, the material is fitted into the threaded groove; the backing member 8 is released from the nut 1, thus completing the joining of the first and second members 11 and 12.

A hole 16 of the second member 12 formed by removal of the pin 14 of the joining tool 13 may be machined to be threaded for possible bolting of a further member.

The nut 1 may be replaced by a member to be fitted having parallel grooves on a wall surface defining an opening or by a cap nut.

Figure 3A:
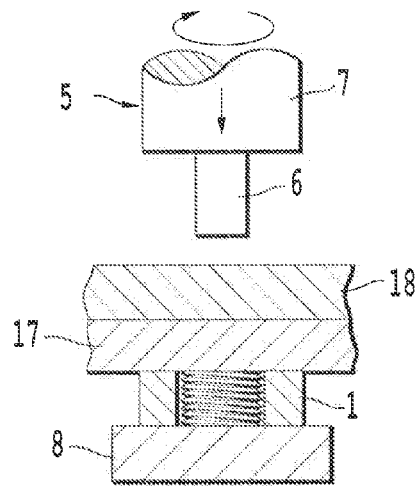
FIG. 3 is a schematic view showing workflow in a third embodiment of a structure for joining members according to the invention.
Figure 3B:
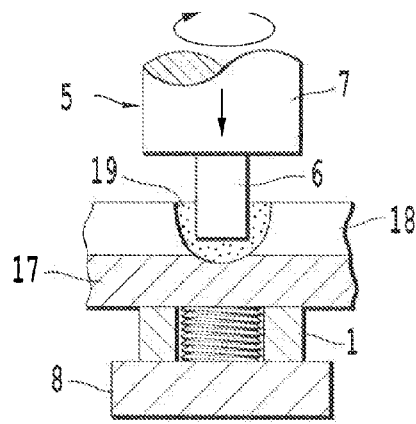
Figure 3C:
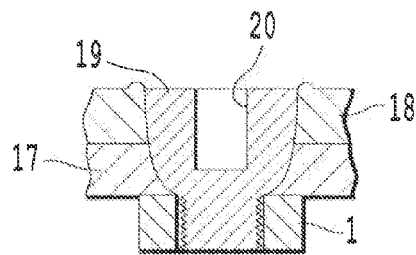

FIG. 3 is directed to a third embodiment of a structure for joining members according to the invention.

The structure for joining members comprises a nut 1, a first member 17 superposed on the nut 1 so as to cover the threaded hole of the nut and a second member 18 superposed on the first member 17, the first and second members 17 and 18 being of the same thickness.

The first and second members 17 and 18 are made of aluminum alloy. The nut 1 may be made of any material such as aluminum alloy or steel.

As shown in (c) of FIG. 3, material derived from the first and second members 17 and 18 is adapted to enter into the threaded hole of the nut 1 due to frictional heat and plastic flow, the first member 17 being clamped by the second member 18 and the nut 1.

The above-mentioned shaping of the first and second members 17 and 18 is conducted, using, e.g., a joining tool 5 as shown in (a) and (b) of FIG. 3.

The joining tool 5 comprises a cylindrical pin 6 smaller in outer diameter than the threaded hole of the nut 1 and coaxially contiguous with a tip surface of a cylindrical shoulder 7 which in turn is larger in outer diameter than the pin 6, an entire length of the pin 6 being slightly shorter than a sum of thicknesses of the first and second members 17 and 18.

The joining tool 5 is made of steel harder and higher in softening temperature than aluminum alloy.

First, the nut 1 is rested on the backing member 8 and the second and first members 18 and 17 are superposed on the nut.

If the nut 1 and the first member 17 are made of the same material, they may be preliminarily fixed together by welding.

Then, while the joining tool 5 is rotated, the pin 6 of the tool 5 is pushed against the second member 18 so that the pin 6 gradually goes in the member softened due to frictional heat and plastic flow.

Soon, the pin 6 of the joining tool 5 passes through the second member 18 and is pushed against the first member 17 and gradually goes in the portion of the first member softened due to frictional heat and plastic flow, resulting in formation of an assimilation layer 19 derived from the members 17 and 18 in softened status around the pin 6 of the joining tool 5.

The assimilation layer 19 is pushed into the threaded hole of the nut 1 and onto an inner periphery constituting the threaded hole. Eventually, the end surface of the shoulder 7 of the joining tool 5 is pushed against the second member 18.

Further, the joining tool 5 is released from the second member 18 to allow the assimilation layer 19 to solidify. Thus, the assimilation layer 19 is fitted into the threaded groove; the backing member 8 is released from the nut 1, thus completing the joining of the first and second members 17 and 18.

A hole 20 of the second member 18 formed by removal of the pin 6 of the joining tool 5 may be machined to be threaded for possible bolting of a further member.

The nut 1 may be replaced by a member to be fitted having parallel grooves on a wall defining an opening or by a cap nut.

Figure 4A:
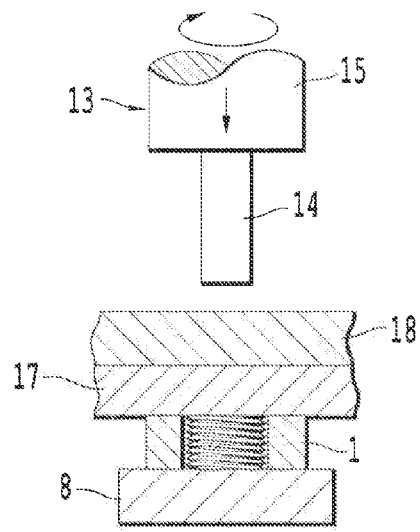
FIG. 4 is a schematic view showing workflow in a fourth embodiment of a structure for joining members according to the invention.
Figure 4B:
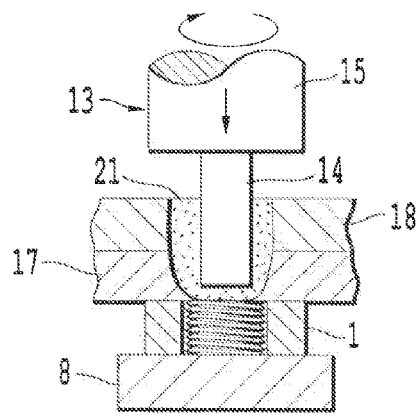
Figure 4C:
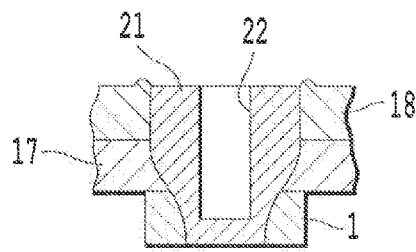

FIG. 4 is directed to a fourth embodiment of a structure for joining members according to the invention.

The structure for joining members comprises a nut 1, a first member 17 superposed on the nut 1 so as to cover the threaded hole of the nut and a second member 18 superposed on the first member 17, the first and second members 17 and 18 being of the same thickness.

All of the nut 1 and first and second members 17 and 18 are made of aluminum alloy.

As shown in (c) of FIG. 4, due to frictional heat and plastic flow, materials derived from the first and second members 17 and 18 are adapted to form an assimilation layer 21 together with material derived from the nut 1 so as to attain assimilation of the nut 1 and first and second members 17 and 18.

The above-mentioned shaping of the first and second members 17 and 18 is conducted, using, e.g., a joining tool 13 as shown in (a) and (b) in FIG. 4.

The joining tool 13 comprises a cylindrical pin 14 smaller in outer diameter than the threaded hole of the nut 1 and coaxially contiguous with a tip surface of a cylindrical shoulder 15 which in turn is larger in outer diameter than the pin 14, an entire length of the pin 14 being slightly shorter than a sum of thicknesses of the nut 1 and first and second members 17 and 18.

The joining tool 13 is made of steel harder and higher in softening temperature than aluminum alloy.

First, the nut 1 is rested on the backing member 8 and the second and first members 18 and 17 are superposed on the nut.

Then, while the joining tool 13 is rotated, the pin 14 of the tool 13 is pushed against the second member 18 so that the pin 14 gradually goes in the member softened due to frictional heat and plastic flow.

Soon, the pin 14 of the joining tool 13 passes through the second member 18 and is pushed against the first member 17 and gradually goes in the portion of the member 17 softened due to frictional heat and plastic flow, resulting in formation of an assimilation layer 21 derived from the members 18 and 17 in softened status around the pin 14 of the joining tool 13.

The assimilation layer 21 also involves material derived from the periphery of the threaded hole of the nut 1. Eventually, the end surface of the shoulder 15 of the joining tool 13 is pushed against the second member 18.

Further, the joining tool 13 is released from the second member 18 to allow the assimilation layer 21 to solidify; the backing member 8 is released from the nut 1, thus completing the joining of the first and second members 17 and 18.

A hole 22 of the second member 18 formed by removal of the pin 14 of the joining tool 13 may be machined to be threaded for possible bolting of a further member.

The nut 1 may be replaced by a member to be fitted having parallel grooves on an inner wall surface defining an opening or by a cap nut. Alternatively, a member having no grooves on an inner wall surface defining an opening may be employed in view of the fact that the material derived from the periphery of the threaded hole of the nut 1 is involved by the assimilation layer 21.

Figure 5A:
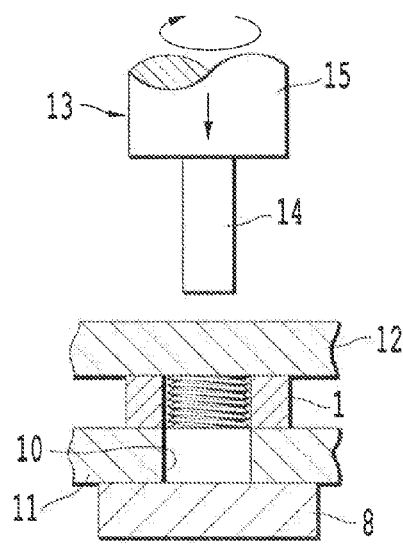
FIG. 5 is a schematic view showing workflow in a fifth embodiment of a structure for joining members according to the invention.
Figure 5B:
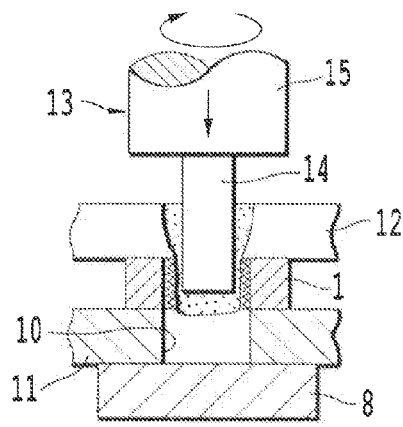
Figure 5C:
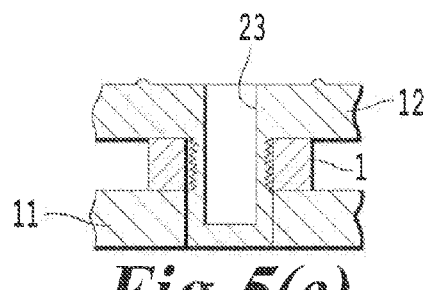

FIG. 5 is directed to a fifth embodiment of a structure for joining members according to the invention.

The structure for joining members comprises a first member 11 preliminarily formed with a hole 10, a nut 1 superposed on the first member 11 so as to make a threaded hole of the nut 1 contiguous with the hole 10 of the member 11, and a second member 12 superposed on the nut 1 so as to cover the threaded hole.

The second member 12 is made of aluminum alloy. The nut 1 and the first member 11 are made of mutually common material other than aluminum alloy, the nut 1 being fixed to the first member 11 by welding or other technique.

As shown in (c) of FIG. 5, material derived from the second member 12 is adapted due to frictional heat and plastic flow to enter into the threaded hole of the nut 1 and hole 10 of the first member 11.

The above-mentioned shaping of the second member 12 is conducted, using, e.g., a joining tool 13 as shown in (a) and (b) in FIG. 5.

The joining tool 13 comprises a cylindrical pin 14 smaller in outer diameter than the threaded hole of the nut 1 and hole 10 of the first member 11 and coaxially contiguous with a tip surface of a cylindrical shoulder 15 which in turn is larger in outer diameter than the pin 14, an entire length of the pin 14 being slightly shorter than a sum of thicknesses of the nut 1 and first and second members 11 and 12.

The joining tool 13 is made of steel harder and higher in softening temperature than aluminum alloy.

First, the first member 11 is rested on the backing member 8 and the second member 12 is superposed on the nut 1 which has been fixed to the first member 11.

Then, while the joining tool 13 is rotated, the pin 14 of the tool 13 is pushed against the second member 12 so that the pin 14 gradually goes in the member softened due to frictional heat and plastic flow.

Soon, material derived from the second member 12 softened due to frictional heat and plastic flow is pushed via the threaded hole of the nut 1 into the hole 10 of the first member 11 and onto an inner periphery defining the threaded hole. Eventually, the end surface of the shoulder 15 of the joining tool 13 is pushed against the second member 12.

Further, the joining tool 13 is released from the second member 12 so that the plastic flow portion of the second member 12 and the material derived from the second member 12 and pushed under plastic flow into the threaded hole of the nut 1 are allowed to solidify; the material is fitted into the threaded groove; and the backing member 8 is released from the first member 11, thus completing the joining of the first and second members 11 and 12.

A hole 23 of the second member 12 formed by removal of the pin 14 of the joining tool 13 may be machined to be threaded for possible bolting of a further member.

The nut 1 may be replaced by a member to be fitted having parallel grooves on an inner wall surface defining an opening.

Figure 6A:
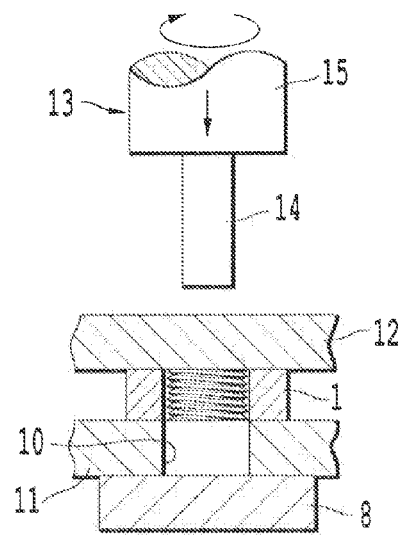
FIG. 6 is a schematic view showing workflow in a sixth embodiment of a structure for joining members according to the invention.
Figure 6B:
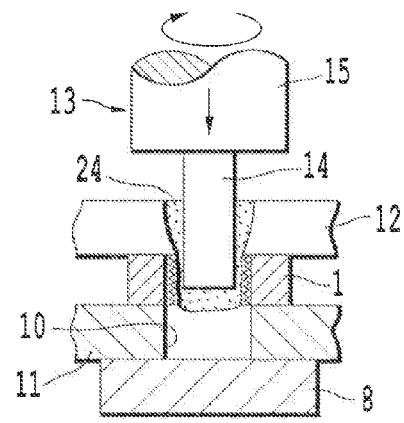
Figure 6C:
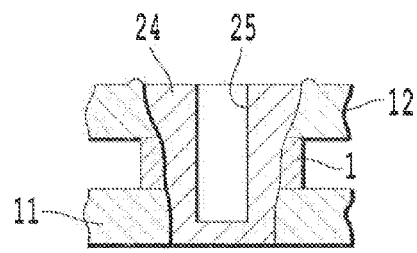

FIG. 6 is directed to a sixth embodiment of a structure for joining members according to the invention.

The structure for joining members comprises a first member 11 preliminarily formed with a hole 10, a nut 1 superposed on the first member 11 so as to make a threaded hole of the nut 1 contiguous with the hole 10 and a second member 12 superposed on the nut 1 so as to cover the threaded hole.

All of the nut 1 and the first and second members 11 and 12 are made of aluminum alloy.

As shown in (c) of FIG. 6, due to frictional heat and plastic flow, material derived from the second member 12 is adapted to form together with material derived from the nut 1 and material derived from the first member 11 into an assimilation layer 24 to attain assimilation of the nut 1 and first and second members 11 and 12.

The above-mentioned shaping of the second member 12 is conducted, using, e.g., a joining tool 13 as shown in (a) and (b) in FIG. 6.

The joining tool 13 comprises a cylindrical pin 14 smaller in outer diameter than the threaded hole of the nut 1 and hole 10 of the first member 11 and coaxially contiguous with a tip surface of a cylindrical shoulder 15 which in turn is larger in outer diameter than the pin 14, an entire length of the pin 14 being slightly shorter than a sum of thicknesses of the nut 1 and first and second members 11 and 12.

The joining tool 13 is made of steel harder and higher in softening temperature than aluminum alloy.

First, the first member is rested on the backing member 8 and the second member 12 is superposed on the nut 1 which has been fixed to the first member 11.

Then, while the joining tool 13 is rotated, the pin 14 of the tool 13 is pushed against the second member 12 so that the pin 14 gradually goes in the member softened due to frictional heat and plastic flow.

Soon, material derived from the second member 12 softened due to frictional heat and plastic flow is pushed via the threaded hole of the nut 1 into the hole 10 of the first member 11, resulting in formation of an assimilation layer 24 in softened status, around the pin 14 of the joining tool 13, of the material derived from the second member 12 and material derived from the periphery of the threaded hole of the nut 1.

The assimilation layer 24 involves the material derived from the periphery of the hole 10 of the first member 11. Eventually, the end surface of the shoulder 15 of the joining tool 13 is pushed against the second member 12.

Further, the joining tool 13 is released from the second member 12 to allow the assimilation layer 24 to solidify. The backing member 8 is released from first member 11, thus completing the joining of the first and second members 11 and 12.

A hole 25 of the second member 12 formed by removal of the pin 14 of the joining tool 13 may be machined to be threaded for possible bolting of a further member.

The nut 1 may be replaced by a member to be fitted having parallel grooves on an inner wall surface defining an opening. Alternatively, a member having no grooves on an inner wall surface defining an opening may be employed in view of the fact that the material derived from the periphery of the threaded hole of the nut 1 is involved by the assimilation layer 24.

Figure 7A:
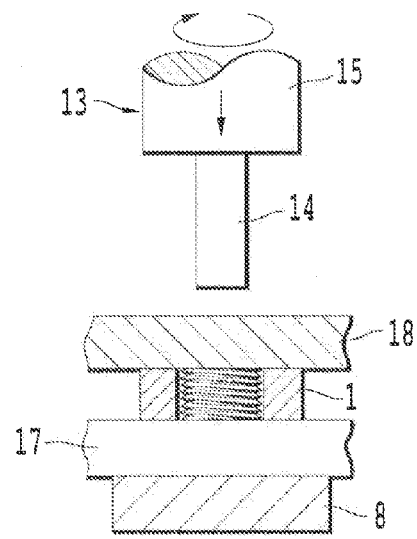
FIG. 7 is a schematic view showing workflow in a seventh embodiment of a structure for joining members according to the invention.
Figure 7B:
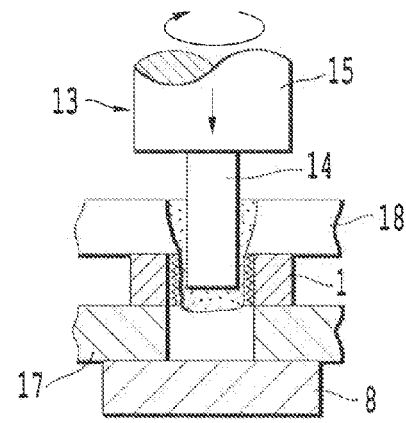
Figure 7C:
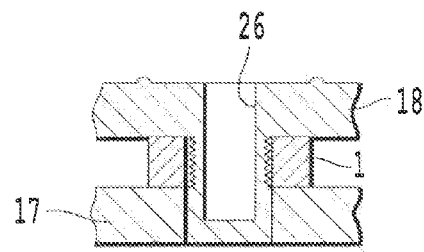

FIG. 7 is directed to a seventh embodiment of a structure for joining members according to the invention.

The structure for joining members comprises a first member 17, a nut 1 superposed on the first member 17, and a second member 18 superposed on the nut 1 so as to cover a threaded hole of the nut.

The first and second members 17 and 18 are made of aluminum alloy. The nut 1 and first member 17 are made of any material such as aluminum alloy or steel.

As shown (c) of FIG. 7, material derived from the second and first members 18 and 17 is adapted due to frictional heat and plastic flow to enter into the threaded hole of the nut 1.

The above-mentioned shaping of the first and second members 17 and 18 is conducted, using, e.g., a joining tool 13 as shown in (a) and (b) in FIG. 7.

The joining tool 13 comprises a cylindrical pin 14 smaller in outer diameter than the threaded hole of the nut 1 and coaxially contiguous with a tip surface of a cylindrical shoulder 15 which in turn is larger in outer diameter than the pin 14, an entire length of the pin 14 being slightly shorter than a sum of thicknesses of the nut 1 and first and second members 17 and 18.

The joining tool 13 is made of steel harder and higher in softening temperature than aluminum alloy.

First, the first member 17 and the nut 1 are rested in the order named on the backing member 8 and the second member 18 is superposed on the nut 1.

Then, while the joining tool 13 is rotated, the pin 14 of the tool 13 is pushed against the second member 18 so that the pin 14 gradually goes in the member softened due to frictional heat and plastic flow.

Soon, material derived from the second member 18 softened due to frictional heat and plastic flow is pushed against an inner periphery of the threaded hole of the nut 1 while the pin 14 reaches the first member 17; material derived from the first member 17 softened due to frictional heat and plastic flow is also pushed against the inner periphery of the threaded hole of the nut 1. Eventually, the end surface of the shoulder 15 of the joining tool 13 is pushed against the second member 12.

Further, the joining tool 13 is released from the second member 18 so that the plastic flow portions of the first and second members 17 and 18 and the material derived from the members 17 and 18 and pushed under plastic flow into the threaded hole of the nut 1 are allowed to solidify; the material is fitted into the threaded groove. The backing member 8 is released from the first member 17, thus completing the joining of the first and second members 17 and 18.

A hole 26 of the second member 18 formed by removal of the pin 14 of the joining tool 13 may be machined to be threaded for possible bolting of a further member.

The nut 1 may be replaced by a member to be fitted having parallel grooves on an inner wall defining an opening.

Figure 8A:
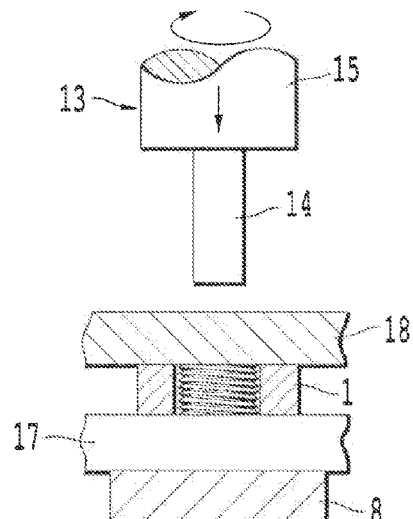
FIG. 8 is a schematic view showing workflow in a eighth embodiment of a structure for joining members according to the invention.
Figure 8B:
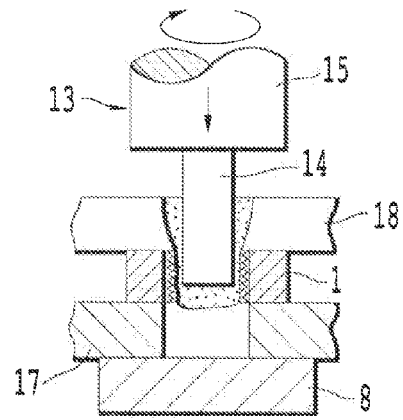
Figure 8C:
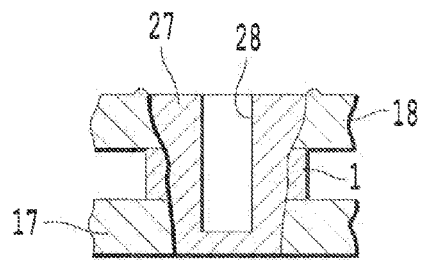

FIG. 8 is directed to an eighth embodiment of a structure for joining members according to the invention.

The structure for joining members comprises a first member 17, a nut 1 superposed on the first member 17 and a second member 18 superposed on the nut 1 so as to cover the threaded hole of the nut.

All of the nut 1 and first and second members 17 and 18 are made of aluminum alloy.

As shown in (c) of FIG. 8, due to frictional heat and plastic flow, material derived from the second member 18 is adapted together with material derived from the nut 1 and first member 17 into an assimilation layer 27 to attain assimilation of the nut 1 and first and second members 17 and 18.

The above-mentioned shaping of the first and second members 17 and 18 is conduced, using, e.g., a joining tool 13 as shown in (a) and (b) in FIG. 8.

The joining tool 13 comprises a cylindrical pin 14 smaller in outer diameter than the threaded hole of the nut 1 and coaxially contiguous with a tip surface of a cylindrical shoulder 15 which in turn is larger in outer diameter than the pin 14, an entire length of the pin 14 being slightly shorter than a sum of nut 1 and first and second members 17 and 18.

The joining tool 13 is made of steel harder and higher in softening temperature than aluminum alloy.

First, the first member 17 and nut 1 are rested on the backing member 8 in the order named and the second member 18 is superposed on the nut 1.

Then, while the joining tool 13 is rotated, the pin 14 of the tool 13 is pushed against the second member 18 so that the pin 14 gradually goes in the member softened due to frictional heat and plastic flow.

Soon, material derived from the second member 18 softened due to frictional heat and plastic flow is pushed into the threaded hole of the nut 1 while the pin 14 reaches the first member 17, resulting in formation of an assimilation layer 27 derived from the first and second members 17 and 18 in softened status around the pin 14 of the joining tool 13.

The assimilation layer 27 involves the material derived from the periphery of the threaded hole of the nut 1. Eventually, the end surface of the shoulder 15 of the joining tool 13 is pushed against the second member 18.

Further, the joining tool 13 is released from the second member 18 to allow the assimilation layer 27 to solidify. The backing member 8 is released from the first member 17, thus completing the joining of the first and second members 17 and 18.

A hole 28 of the second member 18 formed by removal of the pin 14 of the joining tool 13 may be machined to be threaded for possible bolting of a further member.

The nut 1 may be replaced by a member to be joined having parallel grooves on an inner wall surface defining an opening. Alternatively, a member having no grooves on an inner wall surface defining an opening may be employed in view of the fact that the material derived from the periphery of the nut 1 is involved by the assimilation layer 27.

It is to be understood that a structure for joining members according to the invention is not limited to the above embodiments and that various changes and modifications may be made without leaving the scope of the invention.

INDUSTRIAL APPLICABILITY

A structure for joining members according to the invention is applicable to joining and assembling of a variety of parts.

The invention claimed is:

1. A structure for joining members, comprising:

a nut having an opening and threads on a wall defining said opening, a first member superposed on the nut such that a preliminarily formed hole in the first member is contiguous with said opening, and a second member superposed on the first member so as to cover said hole, wherein material from the second member softened due to frictional heat and plastic flow enters into and solidifies in the hole of the first member and the opening and between the threads of the nut, thereby clamping the first member between the second member and the nut to fixedly join the second member, the first member, and the nut.

2. The structure for joining the members according to claim 1, wherein a thickness of the first member in an axial direction of the preliminarily formed hole is less than a thickness of the second member in the axial direction of the preliminarily formed hole.

3. The structure for joining the members according to claim 1, wherein the first member includes a first material and the second member includes a second material that differs from the first material.

* * * * *